United States Patent Office
3,293,218
Patented Dec. 20, 1966

3,293,218
FORMALDEHYDE-POLYHALOGENATED POLYCYCLIC ACID ANHYDRIDE COPOLYMERS
Henri Sidi, Paramus, N.J., assignor, by mesne assignments, to Tenneco Chemicals, Inc., a corporation of Delaware
No Drawing. Filed July 9, 1963, Ser. No. 293,845
10 Claims. (Cl. 260—67)

This invention relates to formaldehyde copolymers and, more particularly, to a new class of high molecular weight copolymers of formaldehyde and polyhalogenated polycyclic acid anhydrides, as well as to the process by which these copolymers are prepared. These new copolymers may be fabricated into films, filaments, fibers, rods and tubes.

The new class of copolymers has been prepared by copolymerizing formaldehyde or its cyclic trimer, trioxane, with a polyhalogenated methanooctahydronapthalic anhydride (or its corresponding acid or esters) under substantially anhydrous conditions. Structurally, these new copolymers contain from about 70 to about 99.9 percent by weight of recurring oxymethylene (—OCH$_2$—) groups and from about 30 to about 0.1 percent by weight of polyhalogenated methanooctahydronaphthoyl groups represented by the formula

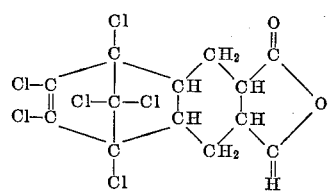

in which each X represents either hydrogen, chlorine, or bromine, $Y^1$, $Y^2$, $Y^3$, and $Y^4$ represent either chlorine or bromine, and Z represents either hydrogen, chlorine, bromine, or a lower alkyl group.

The new copolymers of the invention may be prepared by contacting monomeric formaldehyde (or its cyclic trimer, trioxane) with a polyhalogenated methanooctahydronaphthalic anhydride, preferably in the presence of a formaldehyde polymerization initiator, at a temperature in the range between about 0° C. to about 80° C., and preferably in the range between 10° C. to 40° C. The monomeric formaldehyde used in the preparation of these copolymers may be derived from the pyrolysis of paraformaldehyde, trioxane, α-polyoxymethylene, or a hemiformal, such as cyclohexanol hemiformal. To obtain polymer products having the desired properties, however, the monomeric formaldehyde should be substantially anhydrous, that is, contain less than 0.5 percent and preferably less than 0.1 percent by weight of water. Alternatively, substantially anhydrous trioxane may be used as the source of oxymethylene groups in the copolymer in place of monomeric formaldehyde.

The polyhalogenated methanooctahydronaphthalic anhydrides which are used to prepare the new copolymers of the invention may be represented by the structural formula

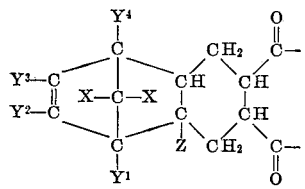

in which X, $Y^1$, $Y^2$, $Y^3$, $Y^4$, and Z are the substituents hereinbefore defined. These polyhalogenated methanooctahydronaphthalic anhydrides, which are described more fully in the copending application of Henri Sidi et al., Serial No. 184,518, filed April 2, 1962, now abandoned, are prepared by the Diels-Alder reaction of tetrahydrophthalic anhydride or a substituted tetrahydrophthalic anhydride with the appropriate polyhalocyclopentadiene. Copolymers having exceptionally good properties have been obtained using 5,6,7,8,9,9-hexachloro-5,8-methanooctahydro-2,3-naphthalic anhydride (hereinafter called "chlorocyclic anhydride") as the comonomer. This anhydride, which may be represented by the structural formula

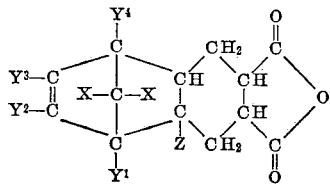

is the product resulting from the Diels-Alder reaction of hexachlorocyclopentadiene and tetrahydrophthalic anhydride. Although the new copolymers of the invention are ordinarily and preferably prepared from the aforementioned polyhalogenated methanooctahydronaphthalic anhydrides, they can also be prepared from the corresponding dicarboxylic acids, from the lower alkylene and alkyl esters of these acids, for example, from the methylene ester, the dimethyl ester, or the dibutyl ester, and from mixtures thereof. If desired, the copolymers may also contain a small proportion of groups derived from other comonomer.

The copolymerization of the formaldehyde and the polyhalogenated methanooctahydronaphthalic anhydride can be effected in the presence or in the absence of a formaldehyde polymerization initiator, which functions to catalyze the copolymerization reaction. When used, the formaldehyde polymerization initiator is generally employed in an amount in the range from about 0.00001 to about 0.05 part, and preferably 0.0001 to 0.005 part by weight per part by weight of monomeric formaldehyde. Any of the well-known formaldehyde polymerization initiators can be used in this process, including aliphatic amines, hydroxypolyamines, phosphines, arsines, stilbenes, organometallic compounds, and boron trifluoride compounds. Excellent results have been obtained using as initiator a boron trifluoride coordinate complex with an organic compound in which oxygen or sulfur is the donor atom. The coordinate complex of boron trifluoride may be, for example, a complex with an alcohol, a phenol, an acid, an ether, an acid anhydride, an ester, a ketone, an aldehyde, a dialkyl sulfide, or a mercaptan. Particularly useful as initiators are boron trifluoride diethyl etherate and boron trifluoride di-n-butyl etherate. Another preferred group of formaldehyde polymerization initiators are the copper, zirconium, zinc, and iron salts of alkanoic acids containing from 2 to 18 carbon atoms, such as, for example, iron octanoate, copper stearate, zinc acetate, zinc hexanoate, zirconium octanoate, and zirconium stearate. A third preferred group of formaldehyde polymerization initiators are chelates of such polyvalent metals as copper, zirconium, zinc, and iron. The chelating agents that may be used include 8-hydroxyquinoline, malonic acid, citraconic acid, N,N-dialkylethylene diamines, o-phenanthroline, phenylalanine, ethylenediamine tetracetic acid, salicylaldehyde, benzoin oxime, dimethylglyoxime, and particularly acetylacetone and similar β-diketones, the use of which latter chelates are described in the copending application of Richard E. Reynolds, Serial No. 293,843, filed July 9, 1963.

The copolymerization is usually carried out in a reaction medium which remains liquid under the polymerization conditions employed. Suitable reaction media include hydrocarbons containing 3 to 10 carbon atoms per molecule, such as propane, hexane, decane, cyclohexane, xylene, and decahydronaphthalene; esters, such as methylene diacetate and methylene dipropionate (the use of which is described in the copending application of Henri Sidi, Serial No. 133,783, filed August 25, 1961, now United States Letters Patent No. 3,219,630); hydrocarbon halides; and ethers. As a general rule, the amount of the reaction medium used is within the range of 1 part to 1000 parts and in most cases 1 part to 100 parts by weight per part by weight of the comonomers.

The copolymerization of the formaldehyde and the polyhalogenated methanooctahydronaphthalic anhydride may be carried out in any convenient manner. For example, anhydrous monomeric formaldehyde and the polymerization initiator may be introduced into a reactor containing the reaction medium and the anhydride. Alternatively, the polymerization initiator may be added to a mixture of monomeric formaldehyde and the anhydride in the reaction medium. The copolymerization of formaldehyde and the polyhalogenated anhydride can be carried out as a batchwise process or as a continuous process.

The anhydrous monomeric formaldehyde is ordinarily introduced into the reactor through a gas inlet tube opening above the surface of the reaction medium so as to avoid plugging due to the formation of polymer within the tube. The reaction mixture is stirred vigorously throughout the addition of the reactants and the polymerization step.

The formation of the formaldehyde copolymers is best effected under non-oxidizing conditions. A convenient way of obtaining such conditions involves sweeping the reactor with a dry inert gas, such as nitrogen, and carrying out the copolymerization under a blanket of the inert gas. In addition an antioxidant may be present during the reaction and/or may be added to the product to reduce oxidative effects. Among the antioxidants that are useful for this purpose are phenothiazine, 2-mercaptobenzimidazole, diphenylamine, phenyl-α-naphthylamine, bis - (β-naphthylamino)-p-phenylenediamine, 4,4'-butylidene - bis - (3-methyl-6-t-butylphenol), and 5-ethyl-10,10-diphenylphenazasiline. The amount of antioxidant used is approximately 0.01 percent to 1 percent based on the weight of the comonomers.

To prevent degradation of the copolymer resulting from prolonged contact with the polymerization initiator, it is generally desirable to remove or neutralize the initiator upon completion of the polymerization step. When a boron trifluoride coordinate complex is used as the initiator, the reaction mixture can be treated with an alkaline material, for example, an aliphatic amine, such as tri-n-butylamine, or an alkali metal salt of an alkanoic acid having from 1 to 18 carbon atoms, to neutralize the initiator. Other initiators can be removed by washing the reaction mixture with water or a suitable organic solvent.

A preferred process according to the invention for producing copolymers containing approximately 70 percent to 99.9 percent by weight of recurring oxymethylene groups and 0.1 percent to 30 percent by weight of recurring polyhalogenated methanooctahydronaphthoyl groups comprises contacting a formaldehyde monomer selected from the group consisting of monomeric formaldehyde and trioxane with a comonomer selected from the group consisting of (a) polyhalogenated methanoocta- hydronaphthalic acids having a structure represented by the formula

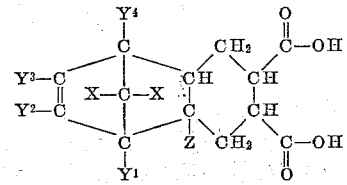

in which each X is a substituent selected from the group consisting of hydrogen, chlorine, and bromine, $Y^1$, $Y^2$, $Y^3$, and $Y^4$ each is a substituent selected from the group consisting of chlorine and bromine, and Z is a substituent selected from the group consisting of hydrogen, chlorine, bromine, and lower alkyl groups, (b) the anhydrides of said acids, (c) the lower alkylene and alkyl esters of said acids, and (d) mixtures thereof, in the presence of a liquid reaction medium in which there is dissolved a catalytic amount of a formaldehyde polymerization initiator at a temperature in the range from about 0° C. to about 80° C. and under substantially anhydrous conditions.

Because improved thermal stability of the copolymer may be obtained by "capping" the terminal hydroxyl groups of the copolymer molecules, it is frequently desirable (through not essential) to chemically stabilize the resultant copolymer by acylation, etherification, cyanoalkylation, or other such procedures. By way of illustration, the copolymers may be acetylated by heating them with methylene diacetate in the presence of an alkaline esterification catalyst.

The new copolymers of the invention are characterized by inherent viscosities of at least 0.1 and preferably above 0.5, measured at 150° C. on 0.5 percent by weight solutions of the copolymer in dimethylformamide containing 1 percent by weight of diphenylamine.

The following examples are illustrative of the ease with which formaldehyde (or trioxane) may be copolymerized with a polyhalogenated methanooctahydronaphthalic anhydride to prepare the new copolymers of the invention:

*Example I*

Anhydrous monomeric formaldehyde was prepared by heating a suspension of 100 grams of α-polyoxymethylene in 400 ml. of mineral oil at 117°–150° C. The formaldehyde vapors from this pyrolysis were passed through a series of traps, the first of which was maintained at room temperature, the second at 0° C., and the third and fourth at −15° C. to −22.5° C. The resulting purified anhydrous monomeric formaldehyde was introduced along with a stream of anhydrous nitrogen into a reactor that contained 572.5 grams of freshly-distilled methylene diacetate, 10 grams of 5,6,7,8,9,9-hexachloro-5,8-methanooctahydro-2,3-naphthalic anhydride (chlorocyclic anhydride) and 0.1 gram of 4,4'-butylene-bis-(3-methyl-6-t-butylphenol). At the same time, a solution of 0.35 ml. of boron trifluoride di-n-butyl etherate in 3.8 ml. of methylene diacetate was added to the reaction mixture, which was stirred vigorously and maintained at a temperature in the range of 25° C. to 30° C. during the addition of the formaldehyde and the boron trifluoride etherate solution, which took place over a period of one hour. After the addition of 2.4 ml. of tri-n-butylamine to neutralize the boron trifluoride the reaction mixture was filtered. The resulting copolymer was washed with 500 ml. of acetone, with four 500 ml. portions of water, and finally with two 500 ml. portions of acetone and then dried under vacuum at 65° C., yielding a formaldehyde-chlorocyclic anhydride copolymer which contained 1.45 percent by weight of chlorine, thus indicating that the copolymer contained 2.9 percent by weight of recurring groups derived from chlorocyclic anhydride.

Example II

Anhydrous monomeric formaldehyde was prepared by heating a suspension of 100 grams of α-polyoxymethylene in 400 ml. of mineral oil at 117°–150° C. The formaldehyde vapors from this pyrolysis were passed through the series of traps described in Example I and then along with a stream of anhydrous nitrogen into a reactor that contained 580.5 grams of freshly-distilled methylene diacetate, 10 grams of chlorocyclic anhydride, 0.1 gram of copper 8-oxyquinolinolate, and 0.1 gram of 4,4'-butylene-bis-(3-methyl - 6 - t - butylphenol). The reaction mixture was stirred vigorously and maintained at a temperature in the range of 25° C. to 30° C. during the addition of the formaldehyde. After the addition of 505 grams of methylene diacetate and 0.5 gram of anhydrous sodium acetate, the reaction mixture was heated at a temperature in the range of 160° C. to 165° C. for one hour, cooled slowly to room temperature, and filtered. The resulting acetylated copolymer was washed with 500 ml. of acetone, with two 500 ml. portions of water at 25° C., with two 500 ml. portions of water at 70° C., and finally with two 500 ml. portions of acetone, the second of which contained 0.1 gram of 4,4'-butylene-bis-(3-methyl-6-t-butylphenol). After drying under vacuum at 65° C., there was obtained 29.7 grams of an acetylated formaldehyde-chlorocyclic anhydride copolymer that had an inherent viscosity of 2.214 and that had excellent thermal stability as indicated by the fact that it lost no weight on being heated at 222° C. for one hour. This product contained 1.66 percent by weight of chlorine, which indicated that the copolymer contained 3.3 percent by weight of recurring groups derived from chlorocyclic anhydride.

Example III

Anhydrous monomeric formaldehyde was prepared by heating a suspension of 100 grams of α-polyoxymethylene in 400 ml. of mineral oil at 117° C.–150° C. The formaldehyde vapors from this pyrolysis were passed through the series of traps described in Example I and then along with a stream of anhydrous nitrogen into a reactor that contained 720.5 grams of freshly-distilled methylene diacetate, 30 grams of chlorocyclic anhydride, 0.1 gram of copper 8-oxyquinolinolate, and 0.1 gram of 4,4'-butylene-bis-(3-methyl-6-t-butylphenol). The reaction mixture was stirred vigorously and maintained at a temperature in the range of 25° C. to 30° C. during the addition of the formaldehyde. After the addition of 225 grams of methylene diacetate and 0.5 gram of anhydrous sodium acetate, the reaction mixture was heated at a temperature in the range of 160° C. to 165° C. for one hour, cooled slowly to room temperature, and filtered. The resulting acetylated copolymer was washed and dried by the procedure described in Example II. There was obtained 33.0 grams of an acetylated formaldehyde-chlorocyclic anhydride copolymer that had an inherent viscosity of 2.448. The product contained 1.46 percent by weight of chlorine, which indicated that it contained 2.9 percent by weight of recurring groups derived from chlorocyclic anhydride.

Example IV

Anhydrous monomeric formaldehyde, obtained by the pyrolysis of 100 grams of α-polyoxymethylene in 400 ml. of mineral oil, was passed through the series of traps described in Example I and then into a reactor that contained 724.5 grams of freshly-distilled methylene diacetate, 10 grams of chlorocyclic anhydride, 0.1 gram of iron octanoate, 7 grams of diethyl oxalate containing 0.1 percent by weight of oxalic acid, and 0.1 gram of 4,4'-butylene-bis-(3-methyl-6 - t - butylphenol). The reaction mixture was stirred vigorously and maintained at a temperature in the range of 25° C. to 30° C. during the addition of the formaldehyde. After the addition of 560 grams of methylene diacetate and 0.5 gram of anhydrous sodium acetate, the reaction mixture was heated at a temperature in the range of 160° C. to 165° C. for one hour, cooled slowly to room temperature, and filtered. The resulting acetylated copolymer was washed and dried by the procedure described in Example II. There was obtained 48.5 grams of an acetylated formaldehyde-chlorocyclic anhydride copolymer that had an inherent viscosity of 0.844.

Example V

Anhydrous monomeric formaldehyde, obtained by the pyrolysis of 100 grams of α-polyoxymethylene in 400 ml. of mineral oil, was passed through the series of traps described in Example I and into a reactor that contained 737.5 grams of freshly-distilled methylene diacetate, 20 grams of chlorocyclic anhydride, 0.1 gram of iron octanoate, 7 grams of diethyl oxalate containing 0.1 percent by weight of oxalic acid, and 0.1 gram of 4,4'-butylene-bis-(3-methyl-6-t-butylphenol). The reaction mixture was stirred vigorously and maintained at a temperature in the range of 25° C. to 30° C. during the addition of the formaldehyde. After the addition of 0.5 gram of anhydrous sodium acetate, the reaction mixture was heated at a temperature in the range of 160° C. to 165° C. for one hour, cooled slowly to room temperature, and filtered. The resulting acetylated copolymer was washed and dried by the procedure described in Example II. There was obtained 47.8 grams of an acetylated formaldehyde-chlorocyclic anhydride copolymer that had an inherent viscosity of 0.810.

Although the foregoing examples illustrate the preparation of copolymers of formaldehyde and chlorocyclic anhydride, similar copolymers may be prepared by using trioxane in place of monomeric formaldehyde and other polyhalogenated methanooctahydronaphthalic anhydrides (or their derivatives) in place of chlorocyclic anhydride.

I claim:

1. A copolymer consisting essentially of recurring oxymethylene groups and recurring polyhalogenated methanooctahydronaphthoyl groups derived from a comonomer selected from the group consisting of (a) polyhalogenated methanooctahydronaphthalic acids having a structure represented by the formula

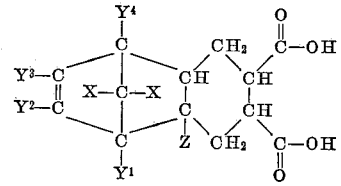

in which each X is a substituent selected from the group consisting of hydrogen, chlorine, and bromine, $Y^1$, $Y^2$, $Y^3$, and $Y^4$ each is a substituent selected from the group consisting of chlorine and bromine, and Z is a substituent selected from the group consisting of hydrogen, chlorine, bromine, and lower alkyl groups, (b) the anhydrides of said acids, (c) the lower alkylene and alkyl esters of said acids, and (d) mixtures thereof, said copolymer being characterized by an inherent viscosity of at least 0.1 when measured at 150° C. on a 0.5 percent by weight solution of the copolymer in dimethylformamide containing 1 percent by weight of diphenylamine.

2. A copolymer consisting essentially of recurring oxymethylene groups and recurring 5,6,7,8,9,9-hexachloro-5,8-methanooctahydro-2,3-naphthoyl groups derived from a comonomer selected from the group consisting of (a) 5,6,7,8,9,9 - hexachloro - 5,8 - methanooctahydro - 2,3-naphthalic acid, (b) the anhydride of said acid, (c) the lower alkylene and alkyl esters of said acid, and (d) mixtures thereof, said copolymer being characterized by an inherent viscosity of at least 0.1 when measured at 150° C. on a 0.5 percent by weight solution of the copolymer in dimethylformamide containing 1 percent by weight of diphenylamine.

3. A copolymer consisting essentially of recurring oxymethylene groups and from about 0.1 to about 30 percent by weight of polyhalogenated methanooctahydronaphthoyl groups derived from a comonomer selected from the group consisting of (a) polyhalogenated methanooctahydronaphthalic acids having a structure represented by the formula

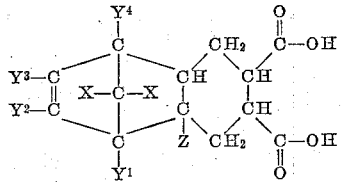

in which each X is a substituent selected from the group consisting of hydrogen, chlorine, and bromine, $Y^1$, $Y^2$, $Y^3$, and $Y^4$ each is a substituent selected from the group consisting of chlorine and bromine, and Z is a substituent selected from the group consisting of hydrogen, chlorine, bromine, and lower alkyl groups, (b) the anhydrides of said acids, (c) the lower alkylene and alkyl esters of said acids, and (d) mixtures thereof, said copolymer being characterized by an inherent viscosity of at least 0.5 when measured at 150° C. on a 0.5 percent by weight solution of the copolymer in dimethylformamide containing 1 percent by weight of diphenylamine.

4. A copolymer consisting essentially of recurring oxymethylene groups and from about 0.1 to about 30 percent by weight of 5,6,7,8,9,9-hexachloro-5,8-methanooctahydro-2,3-naphthoyl groups derived from a comonomer selected from the group consisting of (a) 5,6,7,8,9,9-hexachloro-5,8-methanooctahydro-2,3-naphthalic acid, (b) the anhydride of said acid, (c) the lower alkylene and alkyl esters of said acid, and (d) mixtures thereof, said copolymer being characterized by an inherent viscosity of at least 0.5 when measured at 150° C. on a 0.5 percent by weight solution of the copolymer in dimethylformamide containing 1 percent by weight of diphenylamine.

5. A process for the production of formaldehyde copolymers which comprises contacting a formaldehyde monomer selected from the group consisting of monomeric formaldehyde and trioxane with from about 0.1 to about 30 percent by weight, based on the weight of the formaldehyde monomer which undergoes reaction, of a comonomer selected from the group consisting of (a) polyhalogenated methanooctahydronaphthalic acids having a structure represented by the formula

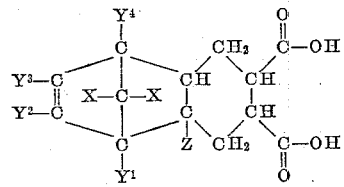

in which each X is a substituent selected from the group consisting of hydrogen, chlorine, and bromine, $Y^1$, $Y^2$, $Y^3$, and $Y^4$ are substituents selected from the group consisting of chlorine and bromine, and Z is a substituent selected from the group consisting of hydrogen, chlorine, bromine, and lower alkyl groups, (b) the anhydrides of said acids, (c) the lower alkylene and alkyl esters of said acids, and (d) mixtures thereof, in the presence of a formaldehyde polymerization initiator and a liquid reaction medium at a temperature in the range between about 0° C. to about 80° C. under substantially anhydrous conditions.

6. A process for the production of formaldehyde copolymers which comprises contacting monomeric formaldehyde with from about 0.1 to about 30 percent by weight, based on the weight of the monomeric formaldehyde which undergoes reaction, of 5,6,7,8,9,9-hexachloro-5,8-methanooctahydro-2,3-naphthalic anhydride in the presence of a liquid reaction medium in which there is dissolved a catalytic amount of a formaldehyde polymerization initiator at a temperature in the range from about 10° C. to about 40° C. under substantially anhydrous conditions.

7. The process of claim 6, in which the formaldehyde polymerization initiator is a boron trifluoride coordinate complex with an organic compound in which the donor atom is a member of the group consisting of oxygen and sulfur.

8. The process of claim 6, in which the formaldehyde polymerization initiator is a chelate of a polyvalent metal.

9. The process of claim 6, in which the formaldehyde polymerization initiator is a salt of an alkanoic acid containing from 2 to 18 carbon atoms and a metal selected from the group consisting of iron, zirconium, zinc, and copper.

10. The process of claim 6, in which the liquid reaction medium is methylene diacetate.

References Cited by the Examiner

UNITED STATES PATENTS 3,087,913  4/1963  Kray et al. _____ 260—73
3,152,103  10/1964  Haigh et al. _____ 260—78.4

OTHER REFERENCES

Kern et al., Angewandte Chemie, 73, No. 6, pp. 177–186 (March 1961), note especially page 183.

Kunststoffe, vol. 53, July 1963, pp. 424–436. English translation available, pp. 11–22.

WILLIAM H. SHORT, *Primary Examiner.*

L. M. MILLER, *Assistant Examiner.*